FREDERICK JONES
INVENTOR

Nov. 29, 1966  F. JONES  3,289,074
METHOD FOR DETERMINING DIELECTRIC LOSS OF COAXIAL CABLE BY
MEASURING THE DECREMENT OF THE TEST OSCILLATION
Filed May 16, 1963  2 Sheets-Sheet 2

FREDERICK JONES
INVENTOR

BY Hall & Houghton

ATTORNEY

United States Patent Office 3,289,074
Patented Nov. 29, 1966

3,289,074
METHOD FOR DETERMINING DIELECTRIC LOSS OF COAXIAL CABLE BY MEASURING THE DECREMENT OF THE TEST OSCILLATION
Frederick Jones, Wembley, Middlesex, England, assignor to Her Majesty's Postmaster General, London, England
Filed May 16, 1963, Ser. No. 281,000
Claims priority, application Great Britain, May 18, 1962, 19,336/62
5 Claims. (Cl. 324—54)

This invention relates to a method of testing coaxial cable, by measurement of the power factor of its dielectric material, and also to an electrical test circuit suitable for use in apparatus for carrying out such tests.

According to the invention, a method of testing coaxial cable by measurement of the power factor of its dielectric material, includes the steps of initiating an electrical oscillation in a test parallel resonant circuit including a test capacitor comprising a specimen of cable to be tested, supplying sufficient electrical energy to the test resonant circuit to balance out losses other than those introduced by the test capacitor, and measuring the decrement of oscillations in the test resonant circuit to provide a measurement of the loss angle, and hence of the power factor, of the dielectric material of the cable specimen.

The losses in the parallel resonant circuit, apart from those introduced by the test capacitor, may be balanced out by initially connecting in parallel with the inductor a low-loss reference capacitor to form a reference resonant circuit, setting up an undamped oscillation in the reference resonant circuit, and then substituting the test capacitor for the reference capacitor and initiating in the test resonant circuit so formed an electrical oscillation having an initial amplitude equal to that of the undamped oscillation. The electrical oscillation so initiated in the test resonant circuit will exhibit a damped characteristic due to the losses introduced by the test capacitor and hence the decrement of oscillations in the test resonant circuit will be a measure of those losses and of the power factor of the dielectric material of the cable specimen. The undamped oscillation in the reference resonant circuit is obtained by supplying sufficient electrical energy to the reference resonant circuit to balance out the losses of the components thereof. The same amount of energy is then supplied to the test resonant circuit and, effectively, this balances out all losses other than those due to the test capacitor since the reference capacitor introduces a negligible loss into the reference resonant circuit.

The electrical energy for balancing out the losses referred to above preferably is supplied from a variable gain positive feed-back amplifier loop to which the inductor of the resonant circuit is loosely electrically coupled. The gain of the amplifier necessary to establish an undamped oscillation in the reference resonant circuit then is left unchanged when oscillations are initiated in the test resonant circuit.

The oscillations may be visually displayed and the decrement of the oscillations in the test resonant circuit may be measured by observation of the amplitude of the display.

The oscillations in the test and reference resonant circuits may be initiated and terminated by switching those respective circuits respectively out of and into a low impedance electrical current path and conveniently the switching may be electrically pulse controlled.

The invention provides also an electrical test circuit suitable for use in apparatus for performing the method of testing according to the invention. The circuit includes a test jig adapted to receive a specimen of cable to be tested and thereby form a test capacitor, a low-loss reference capacitor and an inductor connectable alternatively in parallel with the reference and test capacitors to form the reference and test parallel resonant circuits. The respective resonant circuits are arranged for excitation under control of electrical control pulses and the inductor is loosely electrically coupled to a high-stability variable gain positive feed-back loop. The coupling between the resonant circuit and the positive feed-back amplifier loop should impose a minimum of damping on the resonant circuit and a suitable coupling arrangement utilises inductive windings loosely coupled to the inductor of the resonant circuit. The degree of coupling may be adjustable, conveniently to vary the coupling factor over the range 0.1 to 0.01. The inductor may be connected to a low resistance direct current path including a switching device controllable by a control pulse source in such manner that the switching device is opened, thereby breaking the current path, for the duration of respective control pulses.

The positive feed-back loop may include a high-stability amplifier preceded by a buffer amplifier and a phase change network. The high-stability amplifier may itself have a constant gain, the gain of the loop being adjustable by a variable attenuator connected to the output of the high-stability amplifier. The output of the high-stability amplifier may be connected to a measuring device, for example a cathode ray oscilloscope for displaying the oscillations of the test and reference resonant circuits.

Preferably, the reference capacitor is a low-loss coaxial air dielectric capacitor whose capacitance is variable over a small range.

In carrying out a method of testing in accordance with the invention, the cable specimen is carefully prepared to avoid any distortion of its conductors and the ends of the cable specimen preferably are treated to prevent leakage between the inner and outer conductors of the cable across the end faces of the exposed dielectric material. Advantageously, the test apparatus is operated in a dry enclosure preferably containing silica gel as a similar material.

The method of testing according to the invention is useful in testing coaxial submarine cable in order to ensure that the power factor of the dielectric material of the cable, usually polythene, is within required limits and enables remedial adjustment of the cable manufacturing apparatus to be taken if necessary. The method according to the invention has been found to permit the measurement of the power factor of a polythene dielectric coaxial cable to an accuracy of three significant figures.

By way of example, the invention will be described in greater detail with reference to the accompanying drawings, in which:

FIG. 1 shows schematically the basic components of an apparatus suitable for carrying out a method of testing a coaxial cable, in accordance with the invention, by measuring the power factor, or the loss angle, of the dielectric material of the cable.

In that figure, an oscillation circuit OC (a suitable form of which is shown in greater detail in FIG. 2) includes an electrical current path connected between current supply terminals $t_1$ and $t_2$. The current path includes a switching device SW1 and a parallel resonant circuit comprising a screened inductor L1 and either a low-loss reference capacitor CR or a test capacitor CT, depending upon the position of a changeover switch SW2. The test capacitor CT comprises a specimen of the cable to be tested, the specimen being so chosen that a test capacitor of similar capacitance to that of the reference capacitor CR is formed. A suitable form of construction of the capacitors CR and CT is shown in FIG. 3.

The switch device SW1 is normally closed, as shown, so that current flows through the inductor L1.

The switch device SW1 can be opened for the duration of gating pulses supplied by a pulse generator PG to interrupt current flow through the inductor L1 and thereby initiate oscillations in the parallel resonant circuit.

The resonant circuit is loosely electrically coupled to the input of a highly stable positive feed-back amplifier AMP whose output is coupled also to the resonant circuit via a variable attenuator ATT. The output of the amplifier AMP is connected also to a cathode ray oscilloscope CRO.

Figure 2:
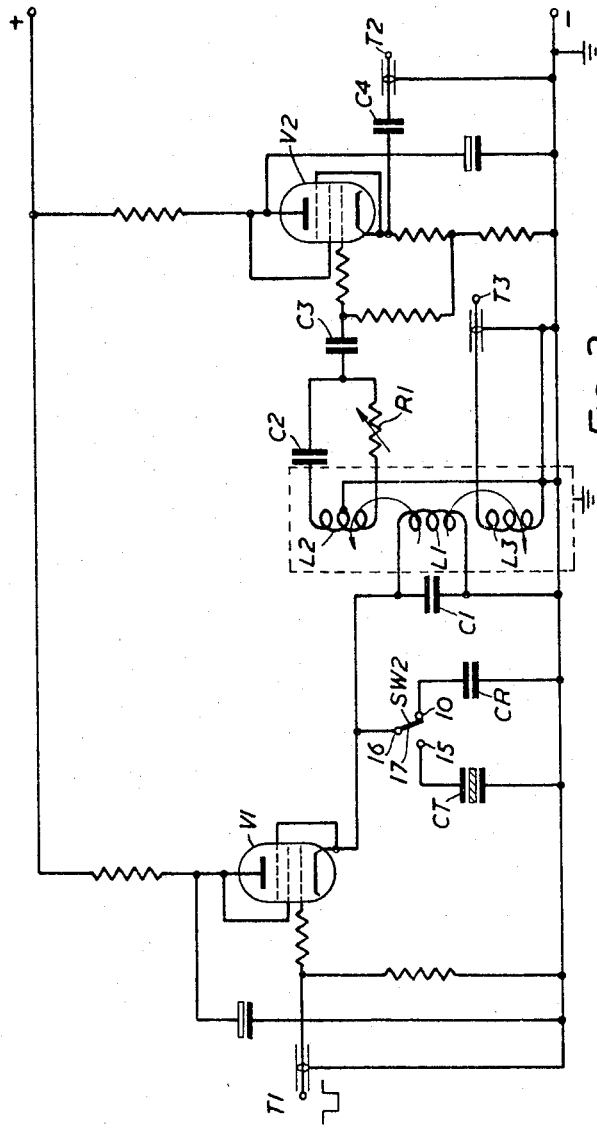
FIG. 2 is the circuit diagram of a test circuit embodying the invention.
Figure 3:
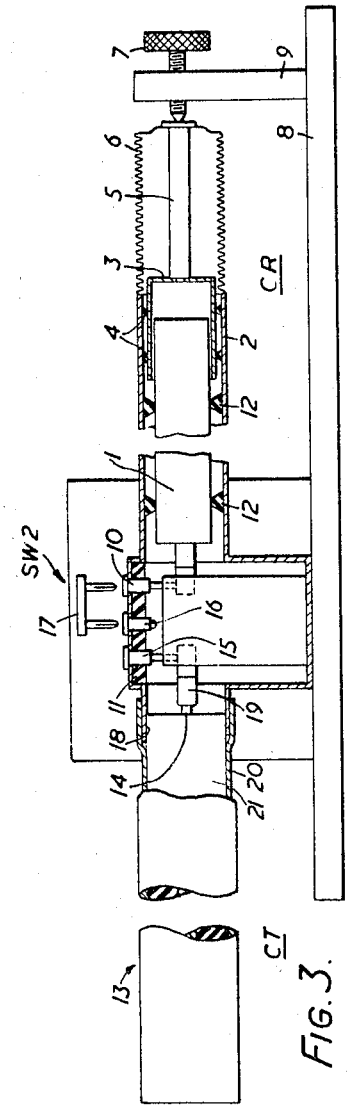
FIG. 3 shows a suitable mechanical construction of part of FIG. 2.

A suitable form of oscillation circuit OC is shown in greater detail in FIG. 2. The inductor L1 is permanently shunted by a capacitor C1. With the switch SW2 in the position shown in FIG. 2, a reference parallel resonant circuit is formed by the combination L1C1 shunted by a very low-loss reference capacitor CR, which as shown in FIG. 3 may conveniently be a coaxial air dielectric capacitor. The capacitor CR preferably is adjustable over a small range of capacitance. By switching the changeover switch SW2 to the other position shown in FIG. 2, a test resonant circuit is formed by the combination L1C1 shunted by a test capacitor CT which comprises a specimen of coaxial cable to be tested. The sample is so selected that the capacitor CT has a capacitance equal to that of the capacitor CR. Thus, both the reference and test resonant circuits have the same natural frequency of oscillation.

The inductor L1 is connected in the cathode circuit of a pentode thermionic valve V1, which forms the switching device SW1, and which is normally conducting so that a steady current flows through the inductor L1. The valve V1 may be switched to a non-conductive state during application to its control grid, via an input terminal T1, of a suitable negative going gating pulse from the source PG. Such a pulse cuts off the cathode current of the valve V1 and initiates an oscillation in the resonant circuit L1, C1, CR or L1, C1, Ct, dependent upon the position of the switch SW2. At the end of a gating pulse, the valve V1 commences to conduct again and shunts the resonant circuit with a low impedance so that oscillation is prevented.

The inductor L1 is coupled to the input of the amplifier AMP via a phase shifting circuit and a buffer amplifier. An inductor is loosely electrically coupled to the inductor L1 and its ends are connected by a capacitor C2 and a resistor R1 which together form the phase shifting circuit. Preferably, as shown in FIG. 2, the resistor R1 is variable. Conveniently the inductor L2 has an earthed centre tap. The junction of the capacitor C2 and the resistor R1 is coupled by a capacitor C3 to the input of a cathode-follower stage including a pentode thermionic valve V2. The output of the valve V2 is coupled by a capacitor C4 to a terminal T2 for connection to the input of the amplifier AMP.

The cathode-follower stage V2 has a high input impedance and, by variation of the resistor R1, it is possible to vary the phase of signals fed from the resonant circuit to the amplifier AMP without appreciable change of amplitude.

An inductor L3 is loosely electrically coupled to the inductor L1, the inductor L3 being connected to a terminal T3 for connection to the output of the attenuator ATT.

The switching valve V1, the resonant circuit components CR, CT, L1, C1, the switch SW2, the coupling coils L2 and L3, and the phase shift circuit R1, C2, are all mounted in close proximity to each other, the inductors L1, L2 and L3 being mounted in a screened container.

FIG. 3 illustrates suitable constructions of the reference capacitor CR and of the test capacitor CT. The reference capacitor CR is made as a coaxial air dielectric capacitor having an inner conductor 1 supported in spaced relationship from an outer conductor 2 by two annular discs 12 made of low-loss insulating material. A metal sleeve 3, located between the conductors 1 and 2 by insulating annular discs 4 is connected by a metal rod 5 to one end of a metal bellows 6 whose other end is connected to conductor 2 so that there is an electrical connection between the sleeve 3 and the conductor 2. The axial length of the bellows 6, and hence the position of the sleeve 3, may be varied by adjustment of a screw 7 supported from a base member 8 by a member 9. The inner conductor 1 is connected to a socket 10 mounted on a low-loss dielectric panel 11 supported on the base member 8.

As shown in FIG. 3, the mounting of the panel 11 also provides a jig comprising an outer metal sleeve 18 surrounding a central inner sleeve 19 connected to a socket 15 mounted on the panel 11. The jig is so dimensioned that it can receive a specimen 13 of coaxial cable to be tested. The inner conductor 14 of the cable specimen 13 is connected to the sleeve 19 whilst the outer conductor 20 of the cable specimen 13 is connected to the sleeve 18 to maintain the coaxial continuity. The mounting panel 11 also has a socket 16, intermediate the sockets 10 and 15 and the socket 16 is connected to the cathode of the valve V1 and to the ungrounded end of the inductor L1. A two-pin shorting plug 17 is insertable in sockets 10 and 16 or 15 and 16 and forms the changeover switch SW2 (FIGS. 1 and 2).

At both ends of the cable specimen 13, the annular end of the dielectric 21 is sealed over to exclude moisture and leakage over those ends. The specimen 13 of the cable is carefully prepared and any distortion of its conductors 14 and 20 is avoided.

Figure 1:
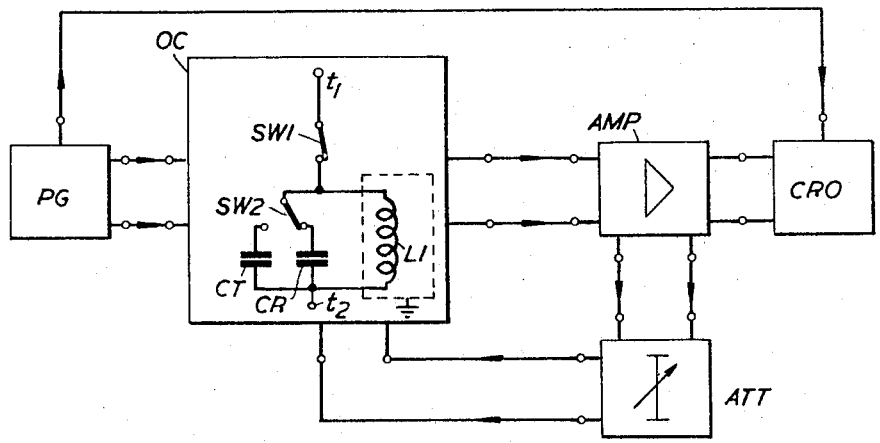
FIG. 1 is a block schematic diagram of an apparatus suitable for carrying out tests in accordance with the invention and including a test circuit embodying the invention.

In order to carry out a test in accordance with the present invention, the testing apparatus described with reference to and shown by FIGS. 1–3 is advantageously located in a dry enclosure which preferably contains silica gel to obviate the effects any moisture ingress into the enclosure. The test apparatus is operated in the following manner. With the switch in the position shown (i.e. with a reference resonant circuit formed by the inductor L1 and the reference capacitor CR), a gating pulse is applied from the pulse generator PG to open the switch SW1 and to trigger the time base of the oscilloscope CRO. Opening of the switch SW1 sets up a damped oscillation in the reference resonant circuit L1, CR which oscillation is displayed by the oscilloscope CRO. By careful adjustment of the attenuator ATT it is arranged that the amplifier AMP feeds back to the resonant circuit sufficient energy to neutralise the losses of the resonant circuit and set up an undamped oscillation in that circuit. Under these conditions the amplitude of oscillations in the resonant circuit remains constant for the duration of the pulse supplied by the generator PG. At the end of a gating pulse, the switch device SW1 is once again closed and oscillations in the reference resonant circuit L1, CR cease due to its reconnection in a low impedance current path.

The switch SW2 now is switched to its other position to form a test resonant circuit comprising the inductor L1 and the test capacitor CT formed by the cable specimen. A gating pulse from the source PG is again applied to open the switch SW1 and initiate oscillations in the test resonant circuit L1, CT and to trigger the time base of the oscilloscope CRO. The attenuator setting which was required to neutralise the losses in the reference resonant circuit L1, CR is left unchanged and the oscilloscope displays a damped oscillation, the decrement of which is a measure of the losses introduced into the resonant circuit L1, CT by the capacitor CT, since the losses due to the inductor L1 are balanced by reason of the energy fed back by the amplifier AMP.

The delay of the amplitude of oscillations in the test resonant circuit is given by $$e = E - \left(\frac{\omega \tan \delta}{2} \cdot t\right)$$

where $e$=the amplitude of oscillation at a time period $t$ after an initial oscillation of amplitude E; $\delta$ is the loss angle of the dielectric material of the cable specimen being tested; and $\omega$ is the angular resonant frequency of the resonant circuit.

Figure 4:
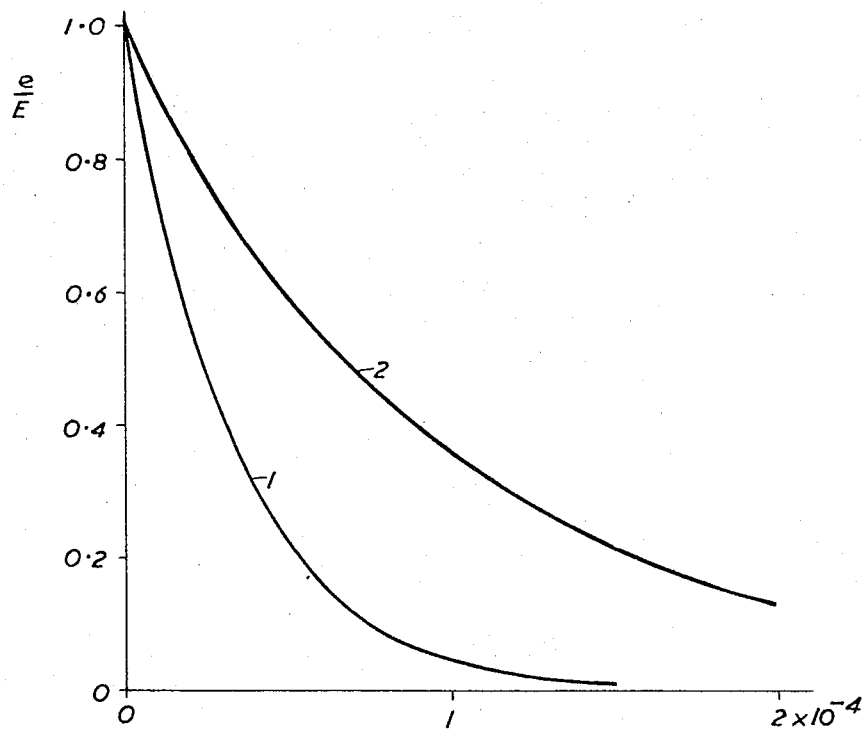
FIG. 4 is a graph relating decrement of a resonant circuit to loss angle.

Conveniently, the amplitude of oscillation may be measured at the beginning and at the end of a gating pulse from the pulse generator PG. The loss angle, from which the power factor can be calculated, may then be deduced from the above equation. FIG. 4 shows a graph of the ratio $e/E$, after a period of $10^{-2}$ secs., plotted against $\tan \delta$ for a resonant circuit having a natural resonant frequency of 1 mc./s. Curve 1 relates to a circuit in which all the loss occurs in a capacitor which provides the total capacitance of the resonant circuit and curve 2 relates to a circuit in which all the loss occurs in a capacitor which contributes one third of the total capacitance. For $t = 10^{-2}$ secs. the latter arrangement is preferable for $\tan \delta \simeq 1 \times 10^{-4}$.

Instead of directly measuring the amplitude of the trace on the oscilloscope at the start and finish of a pulse from the pulse generator PG, other methods may be used. For example, a double beam oscilloscope can be used and a continuous oscillation of controllable and measurable amplitude applied to the second beam. The amplitude of the second trace is made to match first the initial and then the final amplitude of the damped oscillation. Alternatively, the commencement of a pulse from the pulse generator PG may be caused to set off a pair of short sampling pulses of fixed spacing, enabling the amplitudes of the damped oscillation at the two pulse times to be routed over separately adjustable paths and compared. A third method would be to re-adjust the attenuator ATT to restore the undamped condition when the test capacitor CT is connected in the resonant circuit, the change in the attenuator setting being a measure of the loss in the dielectric material of the cable specimen.

Conveniently, measurements may be made at an oscillatory frequency in the region of 1 mc./s. Suitable component values then are as follows:

$L1 = 250$ μh.    Q-factor$=200$
$L2, L3 = 15$ μh.
$C2 = 80$ pf.    $CT = CR = 40$ pf.

The coupling between L1 and L2 and L1 and L3 may be independently adjustable as indicated in FIG. 2, conveniently over the approximate range 0.1 to 0.01.

The gating pulse supplied to the generator PG conveniently may be of $10^{-2}$ secs. duration, with a repetition rate of 50 per second.

The amplifier AMP is required to be sufficiently stable to render frequent resetting of the attenuator ATT unnecessary. Conveniently the amplifier may comprise four R-C coupled pentode stages having a forward gain of 56 db., reduced by negative feed-back to 30 db.

The arrangement of the cathode follower stage V2 and the network R1, C2 which enables the phase of signals fed from the resonant circuit to the amplifier AMP without appreciable change of output is useful for the following reasons. If the capacitance of the reference capacitor CR is not precisely equal to that of the test capacitor CT, then the net gain of the amplifier positive feedback loop, (AMP, ATT) may be changed when the capacitor CT is substituted for the capacitor CR, so giving rise to false measurement of decrement of oscillations in the test resonant circuit. This difficulty may be avoided by adjustment of the resistor R1 so that small changes in the capacitance of the capacitor CR do not affect the oscilloscope trace.

Instead of the construction of the supporting jig and reference capacitor CR shown in FIG. 3, there may be used a suitable insulating block, made for example of polystyrene, from one end of which the reference capcitor is cantilevered and the other end of which supports the outer and inner sleeves for receiving a cable specimen. The block is milled out intermediate its ends to enable connections to be made between those sleeves, the reference capacitor, and the changeover switch. The inner and outer conductors of the reference capacitor are cantilevered from the one end of the block thus obviating the use of the spacers 12. In addition instead of using a bellows and sleeve for variation of the capacitance of the reference capacitor, a conductive disc may close the unsupported end of the outer conductor, the disc being movable in the plane of the end surface to effect small variations in capacitance.

The apparatus described with reference to FIGS. 1–3 may be calibrated in the following manner. Oscillations are set up in the reference resonant circuit L1, CR in the manner previously described and the attenuator ATT adjusted until the oscilloscope CRO displays an undamped oscillation trace. A series of bifilar wire resistances up to 0.5 ohm in value are then successively inserted in series with the reference capacitor CR and in each case the attenuator ATT is readjusted in order to balance out losses introduced into the reference resonant circuit by the added resistance. The change in power factor of the reference capacitor, computed from its capacitance and the added series resistance, is then plotted against changes in gain of the amplifier loop required to restore undamped oscillations in the reference resonant circuit for that each added series resistance, to give a calibration of the attenuator ATT. The resistances may be constructed from 40 S.W.G. copper wire so that the change of resistance between D.C. conditions and the frequency at which calibration is carried out is within the required accuracy of calibration.

The test method and apparatus described above is particularly suitable for testing specimens of submarine telecommunication coaxial cables which have a polythene dielectric. In such cables, the dielectric constant is required to be maintained within predetermined limits and apparatus as shown in and described with reference to FIGS. 1–3 has been constructed which has enabled measurements to be made of the loss angle of the dielectric of such cable to three significant figures, which is the order of accuracy required. Such tests are carried out during manufacture of the cable and the measurements obtained enable remedial action to be taken, by adjustment of the cable making machinery, should the power factor, or loss angle, of the cable dielectric approach or fall outside the required limits.

I claim:
1. A method of testing co-axial cable by measurement of the power factor of its dielectric material, including, in combination, the steps of:
    (i) setting up, in a reference parallel resonant circuit including a low-loss reference capacitor and an inductor, a reference oscillation initiated by a given amount of energy and reinforced by supplying to said circuit an amount of power that is a function of the energy of the reference oscillation and just sufficient to maintain said reference oscillation in an undamped constant amplitude condition in said reference circuit;
    (ii) then substituting for the said reference capacitor a test capacitor comprising a specimen of cable to be tested and having a capacitance similar to that of the reference capacitor;
    (iii) then setting up in the test parallel resonant cir- cuit provided by step (ii) a test oscillation having a frequency and initial magnitude substantially equal to those of the reference oscillation in step (i) and initiated by the same amount of energy as that employed to initiate the reference oscillation in step (i) and reinforced by supplying to said test reference circuit an amount of power that is the same function of the energy of the oscillation as that employed in step (i) so that any difference in power factor of the dielectric material of said cable specimen from that of said reference capacitor is reflected as damping or decrement of said test oscillation, and (iv) measuring the damping or decrement of said test oscillation under the conditions of step (iii) as a measure of the power factor of the dielectric material of the cable specimen.

2. The method defined by claim 1, in which the said step (i) is practised by establishing an adjustment of the gain of a variable gain positive feed-back loop, to which the said reference resonant circuit is loosely electrically coupled, to supply sufficient electrical energy to the reference resonant circuit at the resonant frequency thereof to neutralise electrical losses therein and in which the said step (iii) is practised without altering the so established gain adjustment.

3. A method of testing co-axial cable by measurement of the power factor of its dielectric material including, in combination, the steps of:

(i) setting up discrete trains of electrical oscillations in a reference parallel resonant circuit including an inductor and a low-loss reference capacitor by repetitively switching the said circuit out of and into a low resistance electrical direct current path, the reference resonant circuit being loosely electrically coupled to a variable gain positive feed-back loop, (ii) so adjusting the gain of the said positive feed-back loop that sufficient electrical energy is supplied by the loop to the said reference resonant circuit at the resonant frequency thereof to balance out any electrical losses therein whereby the said trains of oscillations are undamped and of constant magnitude, (iii) substituting for the said reference capacitor a test capacitor comprising a specimen of co-axial cable to be tested and having a capacitance similar to that of the said reference capacitor, (iv) setting up discrete trains of oscillations in the test resonant circuit formed by practicing said step (iii) by repetitively switching the said test resonant circuit out of and into the said electrical direct current path, said trains of oscillations in said test resonant circuit having a frequency substantially equal to that of said constant magnitude trains of oscillation, (v) maintaining the gain of the said positive feed-back loop at the adjustment obtained by practicing the said step (ii) thereby to neutralise electrical losses in the said test resonant circuit apart from losses introduced by the said test capacitor, and (vi) measuring the decrement of said trains of oscillations set up in the test resonant circuit to provide quantitative measurement of the power factor of the dielectric material of the said cable specimen.

4. A method of testing a co-axial solid dielectric cable by measurement of the power factor of the said dielectric including, in combination, the steps of:

(i) connecting in a low resistance electrical direct current path an inductor alternatively switchably connectable in parallel with a low-loss air dielectric co-axial reference capacitor or a test capacitor comprising a specimen of the said cable to be tested and having a capacitance similar to that of the said reference capacitor, (ii) switching the said inductor in parallel electrical connection with the said reference capacitor to form a reference parallel resonant circuit and repetitively switching the said inductor out of and into the said current path to set up trains of electrical oscillations in the said reference resonant circuit, (iii) displaying the said trains of oscillations on a visual display device, (iv) adjusting the gain of a calibrated variable gain positive feed-back amplifier loop to which the inductor is loosely inductively coupled to a value such that the electrical losses in the reference resonant circuit are neutralised and the said display device displays trains of undamped constant amplitude oscillations, (v) switching the said inductor out of parallel connection with the reference capacitor and into parallel connection with the said test capacitor to form a test resonant circuit and again repetitively switching the said inductor out of and into the said current path with the gain of the said positive feed-back amplifier unchanged from the adjustment obtained whilst practising the said step (iv) to set up trains of damped oscillations in the said test resonant circuit having a frequency substantially equal to and an initial amplitude equal to the amplitude of the said undamped oscillations obtained by practising the said step (iv), and (vi) displaying the said trains of damped oscillations of the test resonant circuit on the said visual display device and utilising the said display of the damped oscillation to calculate the decrement of said trains of oscillations set up in the test resonant circuit and thereby obtain a quantitative measurement of the power factor of the dielectric of the said cable specimen.

5. The method defined by claim 4, in which the said step (vi) is practised by readjusting the gain of the said calibrated amplifier loop to obtain a display of an undamped constant amplitude oscillation of the test resonant circuit and calculating the decrement of the said trains of oscillations set up in the test resonant circuit from the differences in the said readjusted value of amplifier gain and the adjustment obtained when practising the said step (iii).

References Cited by the Examiner

UNITED STATES PATENTS

| 1,932,337 | 10/1933 | Dowling | 324—61 |
| 1,976,904 | 10/1934 | Terman | 324—61 |
| 2,422,742 | 6/1947 | Odessey | 324—61 |
| 2,438,197 | 3/1948 | Wheeler | 324—3 X |
| 2,607,828 | 8/1952 | Razek | 324—61 |
| 2,906,948 | 9/1959 | Shawhan | 324—60 |

WALTER L. CARLSON, *Primary Examiner.*

G. R. STRECKER, *Assistant Examiner.*